US007916199B2

(12) United States Patent
Kagawa et al.

(10) Patent No.: US 7,916,199 B2
(45) Date of Patent: Mar. 29, 2011

(54) PHOTO DETECTION DEVICE (75) Inventors: Keiichiro Kagawa, Osaka (JP); Jun Ohta, Kyoto (JP); Yugo Nose, Gifu (JP); Atsushi Wada, Ogaki (JP); Hajime Takashima, Atsugi (JP)

(73) Assignees: National University Corporation Nara, Nara (JP); Institute of Science and Technology Sanyo Electric Co., Ltd., Osaka (JP)

( * ) Notice: Subject to any disclaimer, the term of this patent is extended or adjusted under 35 U.S.C. 154(b) by 411 days.

(21) Appl. No.: 12/278,141

(22) PCT Filed: Jan. 31, 2007

(86) PCT No.: PCT/JP2007/000046
§ 371 (c)(1),
(2), (4) Date: Aug. 1, 2008

(87) PCT Pub. No.: WO2007/088710
PCT Pub. Date: Aug. 9, 2007

(65) Prior Publication Data
US 2009/0086071 A1     Apr. 2, 2009

(30) Foreign Application Priority Data

Feb. 2, 2006  (JP) ................................ 2006-026391
Feb. 2, 2006  (JP) ................................ 2006-026392

(51) Int. Cl.
*H04N 3/14*   (2006.01)
*H04N 5/335*  (2006.01)
(52) U.S. Cl. ........................................................ 348/308
(58) Field of Classification Search ................... 348/308
See application file for complete search history.

(56) References Cited

U.S. PATENT DOCUMENTS 7,199,828 B2 *   4/2007   Atlas ............................. 348/301
(Continued)

FOREIGN PATENT DOCUMENTS

JP          2001-197362         7/2001
(Continued)

OTHER PUBLICATIONS

International Search Report issued in International Patent Application No. PCT/JP2007/000046, mailed May 1, 2007.
Ikeba, M., et al., "Evaluation of Functional Initializing for a CMOS-Image Sensor", Technical Report of IEICE, Sep. 2003, pp. 19-24, vol. 103 No. 298, The Institute of Electronics, Information and Communication Engineers.

(Continued)

*Primary Examiner* — James M Hannett
(74) *Attorney, Agent, or Firm* — McDermott Will & Emery LLP (57) ABSTRACT A pixel includes a photodiode, an overflow circuit, a first sensing circuit, and a second sensing circuit. The first sensing circuit charges and discharges a cathode capacitance by a photocurrent flowing through a photodiode, and amplifies an obtained voltage by a source follower amplifier so as to be outputted to a data line. The second sensing circuit charges and discharged the cathode capacitance by the photocurrent flowing through the photodiode, and outputs electric charge stored in the cathode capacitance via the data line. A pixel circuit is configured so that a first mode in which the first sensing circuit becomes active and a second mode in which the second sensing circuit becomes active can be switched. The first mode and the second mode are switched according to an amount of light received by the photodiode included in each pixel circuit. Gain is controlled according to the amount of light received, in the first mode, and the storage time is controlled in the second mode.

19 Claims, 10 Drawing Sheets

U.S. PATENT DOCUMENTS 7,277,129 B1 * 10/2007 Lee .............................. 348/308

FOREIGN PATENT DOCUMENTS

| JP | 2004-363666 | 12/2004 |
|---|---|---|
| JP | 2005-33722 | 2/2005 |
| JP | 2005-117101 | 4/2005 |
| JP | 2005-176297 | 6/2005 |
| JP | 2005-295336 | 10/2005 |

OTHER PUBLICATIONS

International Preliminary Report on Patentability PCT/IB/373, Aug. 5, 2008.

PCT/JP2007/000046, Jan. 31, 2007.

* cited by examiner

PHOTO DETECTION DEVICE

CROSS-REFERENCE TO RELATED APPLICATIONS

This application is based upon International Application No. PCT/JP2007/000046, filed Jan. 31, 2007 and claims the benefit of priority from the prior Japanese Patent Applications No. 2006-026391, filed Feb. 2, 2006, and Japanese Patent Application No. 2006-026392, filed Feb. 2, 2006, the entire contents of which are incorporated herein by reference.

BACKGROUND OF THE INVENTION

1. Field of the Invention

The present invention relates to a photo detection device such as a CMOS image sensor.

2. Description of the Related Art

In recent years, CCDs (Charge Coupled Device) or CMOS (Complementary Metal Oxide Semiconductor) image sensor have been used for various image pickup apparatuses such as digital still cameras or digital video cameras.

As a merit of using the CMOS image sensor, the same manufacturing line as that for other general chips is used and it can be packaged into a single chip together with peripheral functions. In this respect, the CMOS image sensor can be driven at lower voltage than CCD and the CMOS image sensor consumes less power than the CCD.

Each pixel of a CMOS sensor has a structure including a photodiode and a switch using MOSFETs. That is, the sensor has a matrix of photodiodes, each of which has a switch attached thereto, and the electric charge of each pixel is read out by operating these switches one by one. For example, Nonpatent Document 1 discloses a pixel circuit of such a CMOS image sensor.

Figure 1:
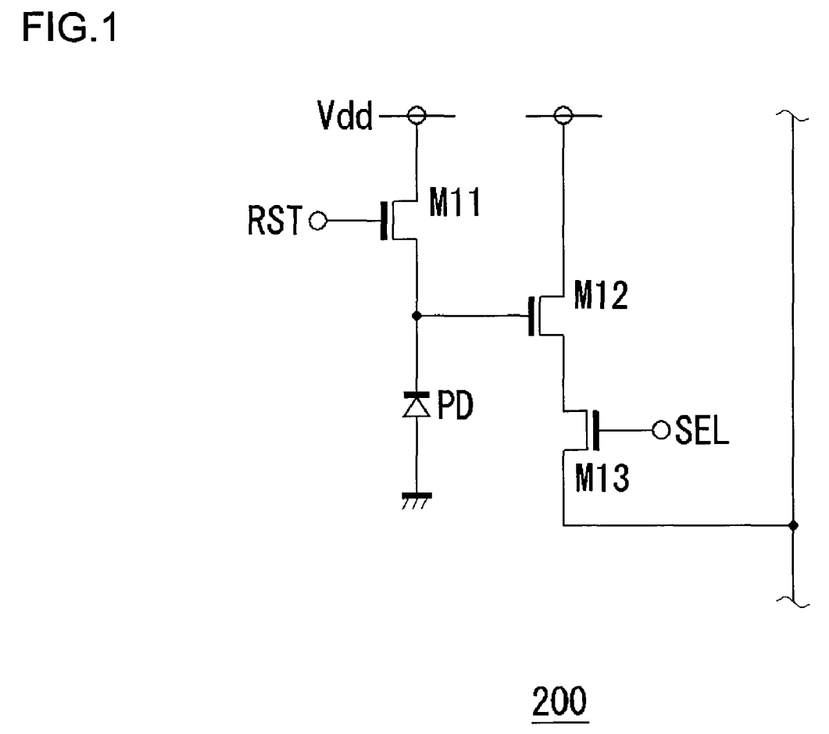
FIG. 1 is a circuit diagram showing a structure of a pixel circuit of a conventional CMOS image sensor.

FIG. 1 is a circuit diagram showing a structure of a pixel circuit 200 of a conventional CMOS image sensor. This pixel circuit 200 includes a photodiode PD, a reset transistor M11, an amplifying transistor M12, and an output transistor M13. The reset transistor M11, the amplifying transistor 12, and the output transistor M13 are all n-channel MOSFETs. The reset transistor M11 and the photodiode PD are connected in series between a supply voltage Vdd and a ground voltage GND. A source terminal of the reset transistor M11 is connected to the photodiode PD, and the supply voltage Vdd is applied to a drain terminal thereof. A reset signal RST is inputted to a gate terminal of the reset transistor M11.

A cathode terminal of the photodiode PD, which is connected with the reset transistor M11, is connected to a gate terminal of the amplifying transistor M12. The supply voltage Vdd is applied to a drain terminal of the amplifying transistor M12, and a source terminal thereof functions as a source follower amplifier, which is connected to a drain terminal of the output transistor M13. A source terminal of the output transistor M13 is connected to a data line LD, which is provided for each column of the CMOS image sensor.

In a pixel circuit 200 structured as described above, when a reset signal RST inputted to the gate terminal of the reset transistor M11 goes to a high level, the reset transistor M11 turns on, thereby applying the supply voltage Vdd to the photodiode PD and charging the cathode terminal thereof with the supply voltage Vdd. Then, the reset transistor M11 turns off. In this state, if light strikes the photodiode PD, a photocurrent will flow, and electric charge stored at the cathode terminal of the photodiode PD will be discharged. At this time, the voltage at the cathode terminal of the photodiode PD changes with the light intensity and the storage time.

After a predetermined storage time has passed, setting a selection signal SEL to a high level turns the output transistor M13 on and a voltage corresponding to the amount of light received by the photodiode PD is outputted, so that the amount of light received by each pixel circuit can be read by an external circuit.

[Nonpatent Document 1] Ikebe et al., "Evaluation of a Functional Initializing for a CMOS-Image Sensor", Technical report of IEICE, The Institute of Electronics, Information and Communication Engineers, September 2003, vol. 103, No. 298, p. 19-24.

[Patent Document 1] Japanese Patent Application Laid-Open No. 2001-197362.

[Patent Document 2] Japanese Patent Application Laid-Open No. 2004-363666.

Here, reviewed is the dynamic range of a pixel circuit of a conventional CMOS sensor described in FIG. 1. As described above, in detecting the amount of light received by each pixel, the photodiode PD is charged with the power supply voltage Vdd, the electric charge stored at the cathode terminal of the photodiode PD during an exposure period is discharged, and the remaining charge amount is converted into voltage to measure the amount of light received. Consequently, if a strong light enters the photodiode PD and the remaining charge amount becomes zero within the charge storage time, the pixel circuit 200 can no longer detect the amount of light having entered the photodiode PD.

Conversely, if the storage time is shortened, the remaining charge amount will not be zero. Thus, strong light can be detected, but if a weak light enters in this state, then it cannot be detected. As stated above, with the conventional pixel circuit 200, the dynamic range is subject to limitation by the amount of initial charge stored at the cathode terminal of the photodiode PD in a reset state. The conventional technique for widening the dynamic range has been through logarithmic conversion or changing the storage time and gain as described in Patent Document 1 or Patent Document 2.

However, a type of circuit which is so-called an active pixel sensor as shown in FIG. 1 where the storage time is varied has a problem that the shorter the minimum storage time is made, the more the power consumption will be for driving the circuit at high speed. Where the gain is varied, it is inevitable that the circuit be made larger in scale if the gain is to be set high.

SUMMARY OF THE INVENTION

The present invention has been made in view of the foregoing circumstances, and a general purpose thereof is to provide a photo detection device with a wider dynamic range.

In order to resolve the above-described problems, one embodiment of the present invention relates to a photo detection device having pixel circuits arranged respectively in intersections of a plurality of data lines and scanning lines. This device comprises: a first sensing circuit which becomes active in a first mode, charges and discharges a capacitance with a photocurrent flowing through a photo detecting element of each pixel circuit and which amplifies and outputs a voltage obtained thereby by a source follower amplifier; a second sensing circuit which becomes active in the second mode, charges and discharges a capacitance with the photocurrent flowing through the photo detecting element, for a predetermined storage time, and outputs electric charge stored in the capacitance; and an output amplifier, provided for each of the plurality of data lines, which amplifiers the voltage outputted from the first sensing circuit at a predetermined gain in the first mode and which converts the electric charge outputted from the second sensing circuit, into voltage in the second mode. The first mode and the second mode are switched according to an amount of light received by the photo detecting element included in each pixel circuit; the gain is controlled, according to the amount of light received, in the first mode; and the storage time is controlled in the second mode.

According to this embodiment, the first sensing circuit capable of detecting a relatively small amount of light and a second sensing circuit capable of detecting a relatively large amount of light are provided and are switched therebetween according to the amount of light received. Hence, the dynamic range can be widened.

Switching the first mode and the second mode therebetween, controlling the gain in the first mode, and controlling the storage time in the second mode may be performed prior to photo-detection at each pixel.

The photo detection device operates under the first mode when the amount of light received is less than a predetermined threshold value, and it operates under the second mode when the amount of light received is greater than the predetermined threshold value. The first mode and the second mode are switched therebetween according to the threshold value, so that the dynamic range can be suitably enlarged.

As the amount of light received becomes smaller in the first mode, the gain may be set higher. As the amount of light received becomes larger in the second mode, the storage time may be set shorter.

Switching the first mode and the second mode therebetween, controlling the gain in the first mode, and controlling the storage time in the second mode may be performed according to potential of a data line to which each pixel connects. The amount of light received is associated with the potential of a data line, so that the first mode and the second mode can be suitably switched.

A mode control circuit which switches between the first mode and the second mode and controls the gain and the storage time may be provided for the each data line. And such a mode control circuit may switch between the first mode and the second mode and controls the gain and the storage time according to the potential of the data line.

The mode control circuit may include: a first comparator which compares the potential of the data line with a first predetermined threshold voltage; and a second comparator which compares the potential of the data line with a second predetermined threshold voltage. The mode control circuit may switch between the first mode and the second mode according to an output of the first comparator, and switch the gain according to an output of the second comparator.

The output amplifier may include an operational amplifier to one input terminal of which a predetermined reference voltage is inputted and the other input terminal of which an output signal of the first sensing circuit or the second sensing circuit is inputted. Prior to photo-detection at each pixel, the capacitance may be initialized by applying the predetermined reference voltage to the capacitance via the second sensing circuit. When the second sensing circuit is set active, the reference voltage is applied to the capacitance and thus the capacitance can be initialized. In this case, the provision of an element for resetting is no longer necessary, so that the circuitry can be simplified.

The predetermined voltage may be switched according to the switching between the first mode and the second mode. Where the dependence of the output of the output amplifier on the amount of light received is opposite in the first mode and the second mode, the voltage range of the output voltage can be made narrower by switching the reference voltage according to the mode in use.

Another embodiment of the present invention relates to a photo detection device having pixel circuits arranged respectively in intersections of a plurality of data lines and scanning lines. In this photo detection device, each of the pixel circuits comprises: a photo detecting element; a first sensing circuit which charges and discharges a capacitance with a photocurrent flowing through the photo detecting element, amplifies a voltage obtained thereby by a source follower amplifier and outputs the amplifier voltage to the data line; and a second sensing circuit which charges and discharges a capacitance with the photocurrent flowing through the photo detecting element and outputs electric charge stored in the capacitance via the data line, wherein a first mode at which the first sensing circuit becomes active and a second mode at which the second sensing circuit becomes active are configured in such a manner as to be switchable therebetween. The photo detection device further comprises: an output amplifier, provided for each of the plurality of data lines, which amplifiers the voltage outputted from the first sensing circuit in the first mode and which converts the electric charge outputted from the second sensing circuit, into voltage in the second mode; and a mode control circuit, provided for each of the plurality of data lines, which switches operational modes of the pixel circuit and the output amplifier according to an amount of light received by the photo detecting element included in the pixel circuit to be connected.

According to this embodiment, the first sensing circuit capable of detecting a relatively small amount of light and a second sensing circuit capable of detecting a relatively large amount of light are provided for each pixel circuit and are switched therebetween according to the amount of light received. Hence, the dynamic range can be widened.

The first sensing circuit may include: an amplifying transistor a gate terminal of which is connected to one end of said photo detecting element; and a first switching transistor provided between a source terminal of the amplifying transistor and the data line to which the pixel circuit connects. The second circuit may include a second switching transistor provided on a path leading from one end of the photo detecting element to the data line to which the pixel circuit connects. The first switching transistor may turn on in the first mode, and the second switching transistor may turn on in the second mode.

The first switching transistor and the second switching transistor are provided on the output paths of the first sensing circuit and the second sensing circuit, respectively, and the turning on of either switch is controlled. As a result, the first mode or the second mode can be selected.

The output amplifier may includes: an operational amplifier, having a first input terminal and a second input terminal, wherein a predetermined reference voltage is applied to the second input terminal thereof; an input capacitor and a third switching transistor provided in series between the first input terminal of the operational amplifier and the data line; a fourth switching transistor which bypasses the input capacitor and the third switching transistor when the fourth switching transistor is on; a feedback capacitor provided between the output terminal of the operational amplifier and the first input terminal thereof; and a fifth switching transistor provided on a feedback path in parallel with the feedback capacitor. In the first mode, the voltage outputted from the first sensing circuit may be amplified at gain determined by a ratio in capacitance of the input capacitor and the feedback capacitor and, in the second mode, electric charge outputted from the second sensing circuit may be transferred to the feedback capacitor to be converted to a voltage.

The feedback capacitor may be a variable capacitor, and the mode control circuit may switch a capacitance value of the feedback capacitor according to an amount of light received by the photo detecting element.

In the second mode, the control circuit may vary the storage time for charging and discharging by the photocurrent, according to the amount of light received by the photo detecting element.

A load circuit connected to the source terminal of the amplifying transistor is provided, for the each data line, external to the pixel circuit. The load circuit may include a transistor, provided between the data line and a terminal at which a potential is fixed, which turns on in the first mode and turns off in the second mode.

The load circuit is shared by the pixel circuit on the same data line, so that the circuit area can be reduced.

The mode control circuit may monitor potential of an associated data line and may switch between the first mode and the second mode according to the potential of the data line. The mode control circuit may include a comparator which compares the potential of the data line with a predetermined threshold voltage, and may switch between the first mode and the second mode according to an output signal of the comparator. The potential of the data line varies according to the amount of light received, so that the mode can be suitably switched.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

With reference to the Figures, the invention will be described hereinbelow based on preferred embodiments. The same or equivalent components, members and processings shown in Figures are given the identical reference numerals and the repeated description thereof will be omitted as appropriate. Also, the embodiments do not intend to limit the scope of the present invention but exemplify the invention. All of the features and the combinations thereof described in the embodiments are not necessarily essential to the invention.

In this patent specification, the state in which "member A and member B are connected" includes a case where the member A and the member B are physically connected together and a case where the member A and the member B are indirectly connected by way of other members that do not affect an electric connection state.

Similarly, "a state where member C is provided between member A and member B" includes not only a case where the member A and the member C are directly connected together or the member B and the member C are directly connected together, but also a case where the members are indirectly connected by way of other members that do not affect the electric connection state.

Figure 2:
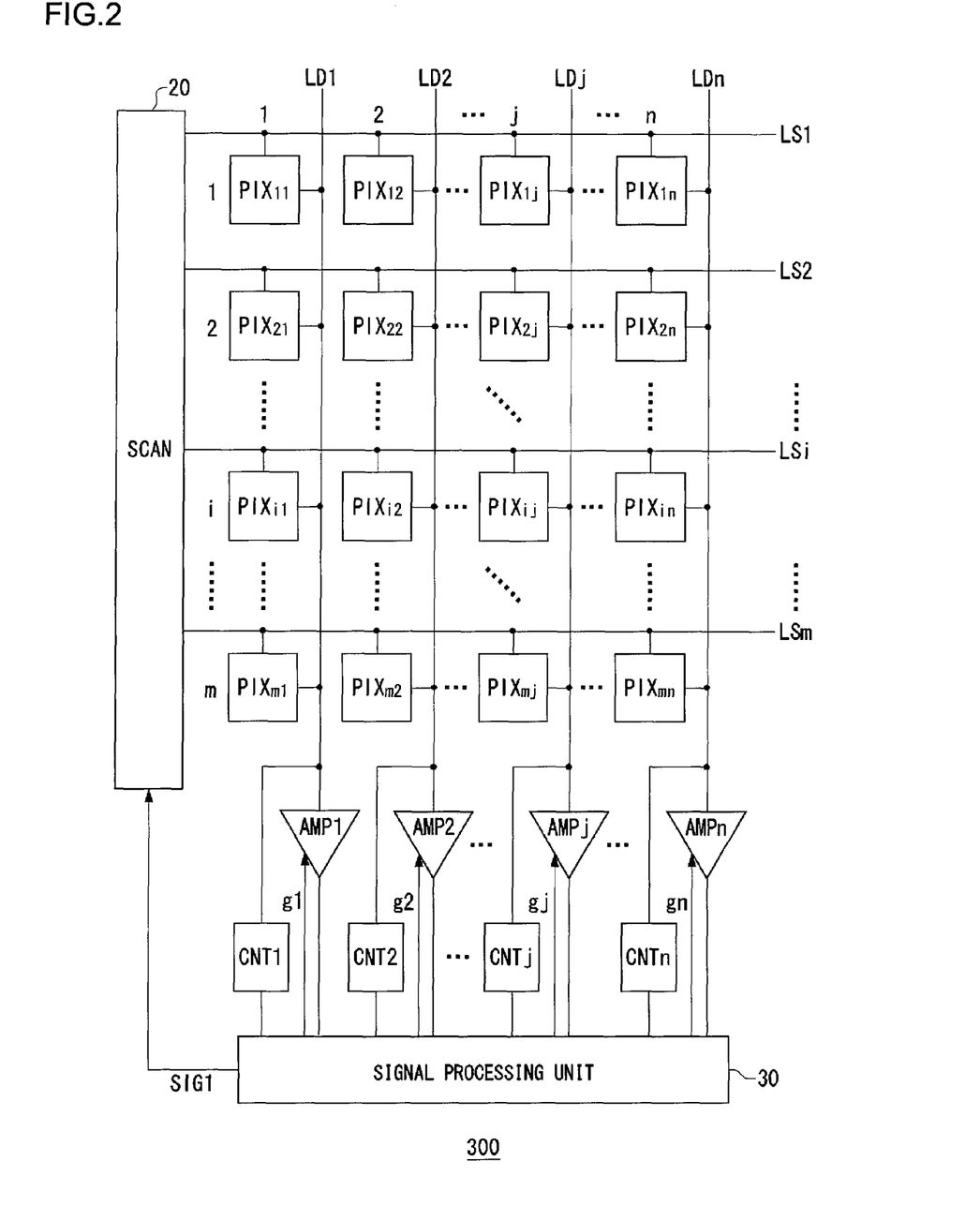
FIG. 2 is a circuit diagram showing a whole structure of a photo detection device according to an embodiment.

A photo detection device according to an embodiment of the present invention is a CMOS image sensor, which is provided with a plurality of pixel circuits arranged in m rows and n columns. FIG. 2 is a circuit diagram showing a whole structure of the photo detection device according to the present embodiment. A photo detection device 300 includes a plurality of pixel circuits (hereinafter also referred to simply as pixels) PIX arranged two-dimensionally in m rows and n columns (m, n being an integer greater than or equal to 2), m scanning lines LS1 to LSm, collectively referred to as scanning lines LS, provided for each row thereof, n data lines LD1 to LDn, collectively referred to as data lines LD, provided for each column thereof, n output amplifiers AMP1 to AMPn, collectively referred to as output amplifiers AMP, n mode control circuits CNT1 to CNTn, collectively referred to as control circuits CNT, a scanning control unit 20, and a signal processing unit 30.

The pixel circuits PIX are each arranged at each of the intersections of a plurality of data lines LD and a plurality of scanning lines LS. The pixel circuits PIX have each a photodiode, which is a photo detecting element. A pixel circuit PIX outputs the amount of light received by the photodiode as an electric signal to a data line LD.

To distinguish the plurality of pixel circuits PIX, arranged in a matrix, from one another, the pixel at the intersection of the ith row and the jth column is denoted by PIXij. Each pixel circuit PIX, which has the same structure, is of an active pixel structure provided with an active element that amplifies a signal and controls the voltage applied to the photodiode.

The n data lines LD1 to LDn are provided for their respective columns, and pixels PIX1j to PIXmj of the jth column are connected to the data line LDj of the jth column. The amount of light detected by each pixel is outputted to the data line LD connected to the each pixel. Also, the m scanning lines LS1 to LSm are provided their respective rows.

The scanning control unit 20 controls the on and off of the active elements contained in the pixel circuits PIX via the scanning lines LS. Though the scanning line LS in each row is depicted as a single line in FIG. 2, the number of the scanning lines LS in each row is actually equal to that of the active elements controlled. The scanning control unit 20 selects the rows successively from the first to the mth row, turns the pixel circuits PIX in the selected row active, and reads out the amounts of light having entered the pixel circuits PIX on the selected row successively. Also, each pixel circuit PIX is supplied with a power supply voltage Vdd by a power supply line LVdd (not shown). Though the detail will be described later, a pixel circuit PIX is so configured that switching can be made between a first mode in which it operates as an active pixel sensor (APS) and a second mode in which it operates as a passive pixel sensor (PPS).

The output amplifiers AMP, which are provided for their respective data lines LD, amplify the signals outputted to the data lines LD from the pixel circuits PIX or convert them into voltages so as to be outputted to the signal processing unit 30. The operation mode of the output amplifiers AMP is switched in synchronization with the operation mode of the pixel circuits PIX. As will be discussed later, a gain g of the output amplifier AMP is switched per pixel according to the amount of light received. Consequently, the signal processing unit 30 outputs a signal by which to switch the gain g.

The mode control circuits CNT, which are provided for their respective data lines LD, control the operation mode of the pixel circuits PIX connected thereto. The structure and operation of the output amplifiers AMP and the mode control circuits CNT are related to the structure and operation of the pixel circuits PIX. Therefore, a description will first be given of the structure of the pixel circuits PIX.

Figure 3:
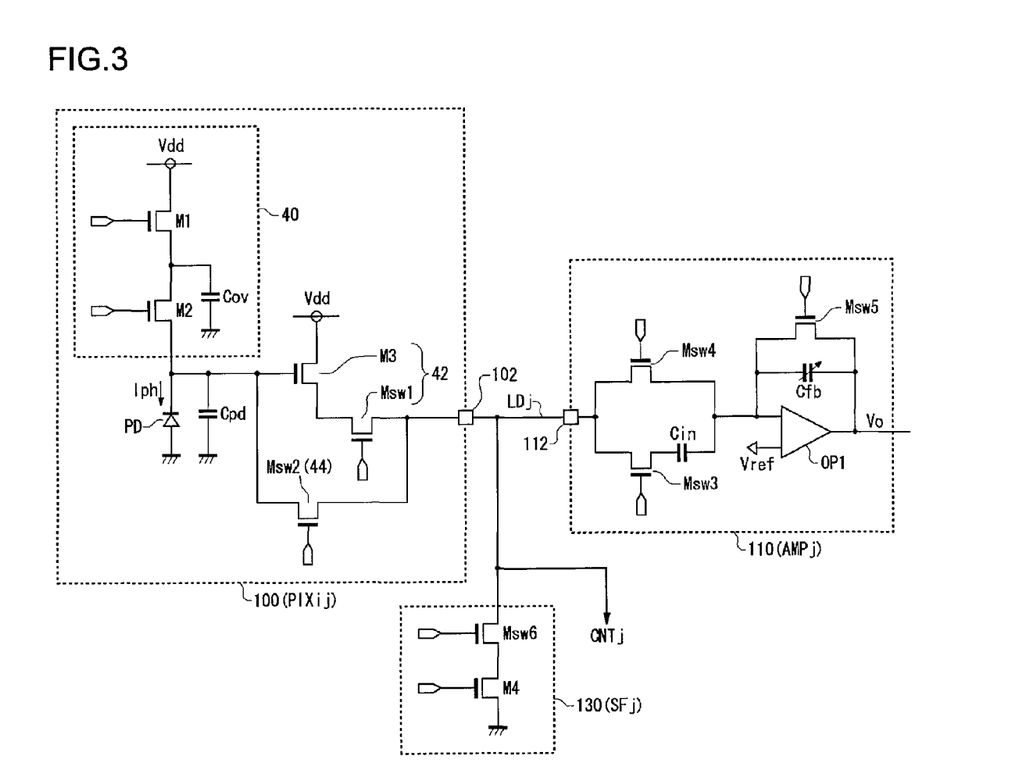
FIG. 3 is a circuit diagram showing a structure of a pixel circuit and an output amplifier according to an embodiment.

FIG. 3 is a circuit diagram showing a structure of a pixel circuit 100 and an output amplifier 110 according to the present embodiment. The pixel circuit 100 includes an overflow circuit 40, a first sensing circuit 42 and a second sensing circuit 44 in addition to a photodiode PD which is a photo detecting element. The pixel circuit PIX according to the present embodiment is so configured that switching can be made between the first mode in which the first sensing circuit 42 becomes active and the second mode in which the second sensing circuit 44 becomes active.

The photodiode PD has its anode terminal grounded. At a cathode terminal of the photodiode PD there exist a photodiode PD's own parasitic capacitance, an inter-wiring capacitance or the like (these capacitances will be hereinafter referred to as cathode capacitance Cpd collectively). The pixel circuit 100 outputs a signal corresponding to the intensity of light having entered the photodiode PD from an output terminal 102. The output terminal 102 is connected to another data line LDj of the column in which each pixel circuit 100 is provided.

The overflow circuit 40, which is connected to the cathode terminal of the photodiode PD, initializes the cathode capacitance Cpd. The overflow circuit 40 includes a reset transistor M1, an overflow transistor M2, and an overflow capacitor Cov. The reset transistor M1 and the overflow transistor M2 are both N-channel MOSFETs (Metal Oxide Semiconductor Field Effect Transistors). A drain terminal of the reset transistor M1 is connected to the power supply line LVdd, so that a power supply voltage Vdd is applied thereto. The overflow capacitor Cov is provided between a source terminal of the reset transistor M1 and ground. A drain terminal of the overflow transistor M2 is connected to the source terminal of the reset transistor M1, whereas a source terminal of the overflow transistor M2 is connected to the cathode terminal of the photodiode PD.

In one embodiment, the first reset transistor M1 is used to reset the cathode capacitance Cpd. In another exemplary structure, the overflow circuit 40 may be configured by including the reset transistor M1 only, without the provision of the overflow capacitor Cov. Also, in still another embodiment, the first reset transistor M1 may be used to function as an antiblooming transistor. In this case, the cathode capacitor Cpd may be reset by the use of a method explained in a modification described later.

The pixel circuit 100 discharges the electric charge stored in the cathode capacitance Cpd for a predetermined storage time by a photocurrent Iph flowing through the photodiode PD. The first sensing circuit 42 amplifies the resulting voltage appearing at the cathode capacitor Cpd by a source follower amplifier and outputs it to the data line LD.

The first sensing circuit 42 includes an amplifier transistor M3 and a first switching transistor Msw1. The amplifier transistor M3 and the first switching transistor Msw1 are both N-channel MOSFETs. A gate terminal of the amplifier transistor M3 is connected to the cathode terminal of the photodiode PD, and a drain terminal thereof is connected to the power supply line LVdd, so that the power supply voltage Vdd is applied thereto.

The first switching transistor Msw1 is provided between a source terminal of the amplifier transistor M3 and a line LDj to which the pixel circuit 100 is connected. That is, one end of the first switching transistor Msw1 is connected to the source terminal of the amplifier transistor M3, and the other end thereof is connected to the output terminal 102.

The second sensing circuit 44 discharges the cathode capacitance Cpd to the photodiode PD by the photocurrent Iph and outputs the electric charge stored in the cathode capacitance Cpd via the data line LDj. The second sensing circuit 44 is configured by including a second switching transistor Msw2. The second switching transistor Msw2 is provided on a path leading from the cathode terminal of the photodiode PD to the data line LDj to which the pixel circuit 100 is connected.

The first switching transistor Msw1 and the second switching transistor Msw2 are switches provided for switching on an operation in the first mode or the second mode. Though the detail will be described later, the first switching transistor Msw1 turns on at least in the first mode, and the second switching transistor Msw2 turns on at least in the second mode. The second switching transistor Msw2 may also be turned on at the time of a reset operation in the first mode.

A load circuit 130 (SFj) connected to a source of the amplifier transistor M3, which functions as a source follower amplifier, is provided outside the pixel circuit 100 for each data line LD and functions as part of the first sensing circuit 42. The load circuit 130 is provided between a data line LD and a ground terminal where the potential is fixed, and it is desired to be configured by including a transistor which is turned on in the first mode and turned off in the second mode. To be more specific, the load circuit 130 includes a sixth switching transistor Msw6 and a constant-current transistor M4, which are each an N-channel MOSFET. The constant-current transistor M4, whose gate terminal is biased to a predetermined potential, operates as a constant-current source. The sixth switching transistor Msw6 is provided on a current path of the constant current generated by the constant-current transistor M4. The sixth switching transistor Msw6 is turned on in the first mode, and the load circuit 130 functions as a constant-current load. The sixth switching transistor Msw6 is turned off in the second mode.

The gate terminal of each transistor of the pixel circuit 100 is connected to a scanning line (not shown), so that an on-off control can be performed independently.

Next, a description will be given of a structure of an output amplifier 110. The output amplifier 110 has its function switched in synchronization with the operation mode of the pixel circuit 100. In the first mode, the output amplifier 110 amplifies the voltage outputted from the pixel circuit 100 at a predetermined gain, whereas, in the second mode, it converts the electric charge outputted from the second sensing circuit 44 into a voltage.

An input terminal 112 of the output amplifier 110 is coupled to the output terminal 102 of the pixel circuit 100 via the data line LDj. The output amplifier 110 includes an operational amplifier OP1, a third switching transistor Msw3, a fourth switching transistor Msw4, a fifth switching transistor Msw5, an input capacitor Cin, and a feedback capacitor Cfb.

The operational amplifier OP1 has a first input terminal and a second input terminal, namely an inverting input terminal and a noninverting input terminal. A predetermined reference voltage Vref is applied to the second input terminal. The input capacitor Cin and the third switching transistor Msw3 are connected in series between the first input terminal of the operational amplifier OP1 and the input terminal 112 to which the first data line LDj is connected. The fourth switching transistor Msw4 is provided between the input terminal 112 and the first input terminal of the operational amplifier OP1 and, when it is on, bypasses the input capacitor Cin and the third switching transistor Msw3.

The feedback capacitor Cfb is provided between the output terminal of the operational amplifier OP1 and the first input terminal. The feedback capacitor Cfb is a variable-capacitance capacitor in the present embodiment. The fifth switching transistor Msw5 is provided on a feedback path in parallel with the feedback capacitor Cfb and, when it is on, bypasses the feedback capacitor Cfb or initializes the electric charge stored.

In the first mode, the output amplifier 110 amplifies the voltage outputted from the first sensing circuit 42 at a gain g(=Cin/Cfb) which is determined by the capacitance ratio between the input capacitor Cin and the feedback capacitor Cfb. Also, in the second mode, the output amplifier 110 converts the electric charge outputted from the second sensing circuit 44 into a voltage by transferring it to the feedback capacitor Cfb.

Refer back to FIG. 2. To widen the dynamic range, the photo detection device 300 according to the present embodiment switches between the first mode and the second mode according to the amount of light received by, namely the illuminance of, the photodiode PD included in each pixel circuit 100. The photo detection device 300 tentatively reads the amount of light received by the photodiode PD first and then operates in the first mode if the value read is lower than a predetermined threshold value or in the second mode if it is higher than the predetermined threshold value. A mode control circuit CNT is provided for the purpose of appropriately switching the first mode and the second mode. The mode control circuit CNT, which is provided for each data line LD, switches the operation mode of the pixel circuit PIX and the output amplifier AMP according to the amount of light received by the photodiode included in the pixel circuit PIX connected thereto.

Further, in the first mode, the mode control circuit CNT may control the gain according to the amount of light received. Controlling the gain can be accomplished by varying the capacitance value of the feedback capacitor Cfb in the output amplifier 110. It is desired that in the second mode the mode control circuit CNT control the storage time according to the amount of light received.

Figure 4:
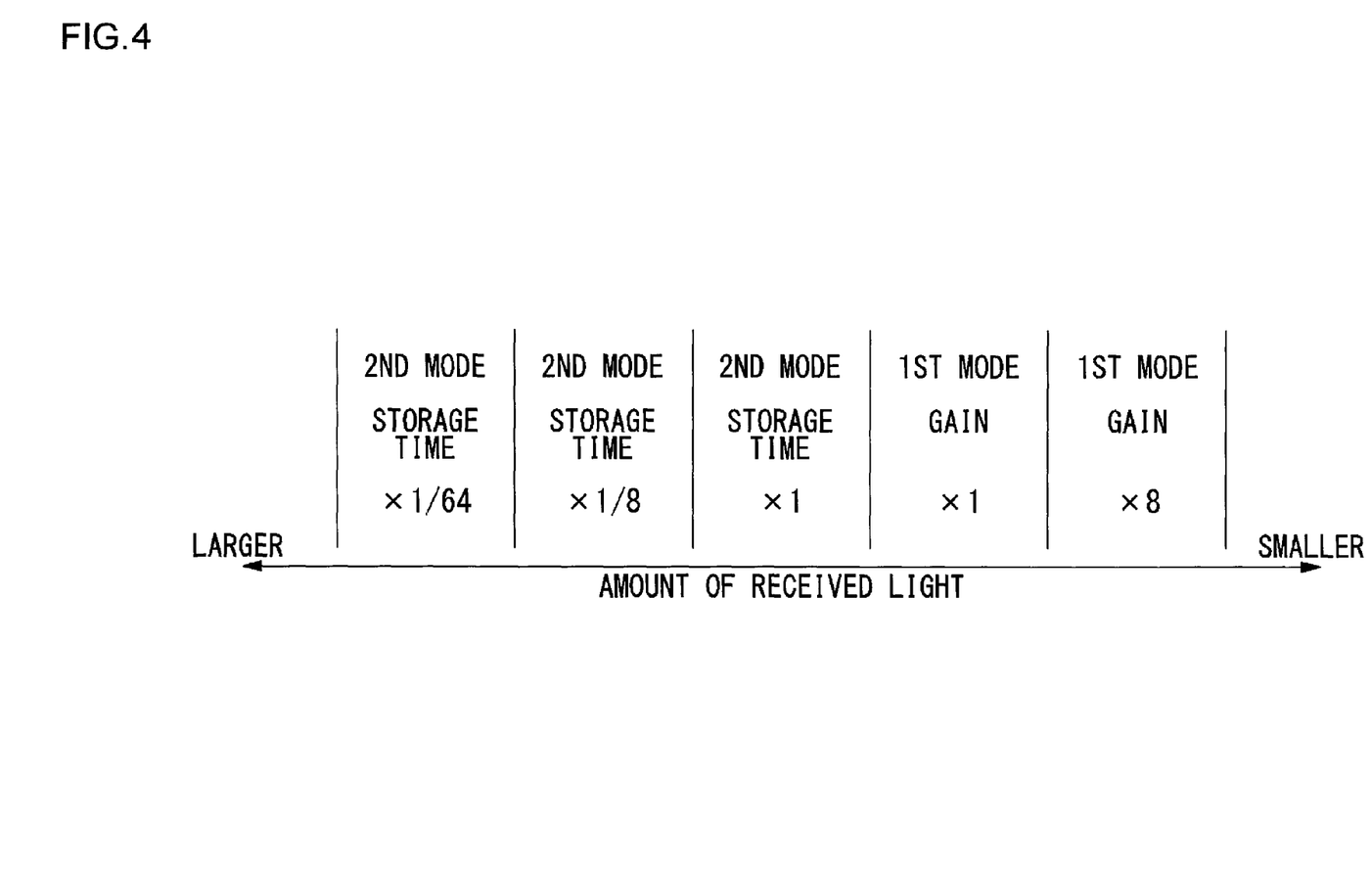
FIG. 4 shows an example of setting a mode according to the amount of light received (illuminance) and setting the gain and storage time.

In the present embodiment, the switching between the first mode and the second mode and the control of the gain in the first mode and the storage time in the second mode are performed prior to the photo-detection at each pixel. FIG. 4 shows an example of setting a mode according to the amount of light received (illuminance) and setting the gain and storage time. If the amount of light received exceeds a certain threshold value, the mode will be set to the second mode. And if it is less than or equal to the threshold value, the mode will be set to the first mode. In the first mode, the gain is set higher as the amount of light received becomes smaller. In the second mode, the storage time is set shorter as the amount of light received becomes larger. Note that the storage time may be varied also in the first mode in order to further enlarge the dynamic range.

The mode control circuit CNT monitors the potential on the data line LD connected thereto in correspondence to the amount of light received by the photodiode PD and switches between the first mode and the second mode according to the potential on the data line. That is, the amount of light received (shown along the horizontal axis) in the FIG. 4 corresponds to the potential on the data line LD.

Figure 5:
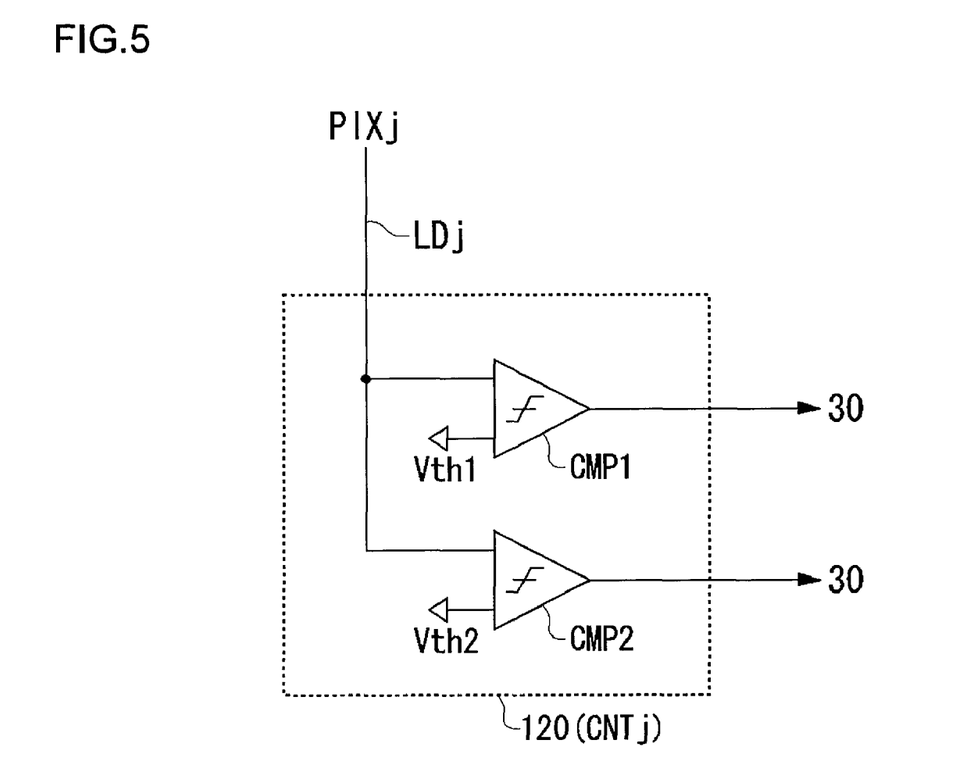
FIG. 5 is a circuit diagram showing an exemplary structure of a mode control circuit.

FIG. 5 is a circuit diagram showing an exemplary structure of a mode control circuit 120. The mode control circuit 120 includes a first comparator CMP1 and a second comparator CMP2.

The first comparator CMP1 compares the potential on the data line LD with a first predetermined threshold voltage Vth1. The signal processing unit 30 switches between the first mode and the second mode according to the output of the first comparator CMP1. In the present embodiment, the potential on the data line LD drops to a lower value as the amount of light received gets larger, whereas it goes up as the amount of light received gets smaller. For instance, when the potential on the data line LD is higher than the first threshold voltage Vth1, the signal processing unit 30 sets the mode to the first mode; and when it is lower than the first threshold voltage Vth1, the signal processing unit 30 sets the mode to the second mode.

The second comparator CMP2 compares the potential on the data line LD with a second predetermined threshold voltage Vth2. The signal processing unit 30 switches the gains of the output amplifiers AMP according to the output of the second comparator CMP2. In the first mode, when the potential on the data line LD is lower than the second threshold voltage Vth2, the gain of the output amplifier AMP may be set lower, whereas when it is higher than the second threshold voltage Vth2, the gain of the output amplifier AMP may be set higher.

Figure 6A:
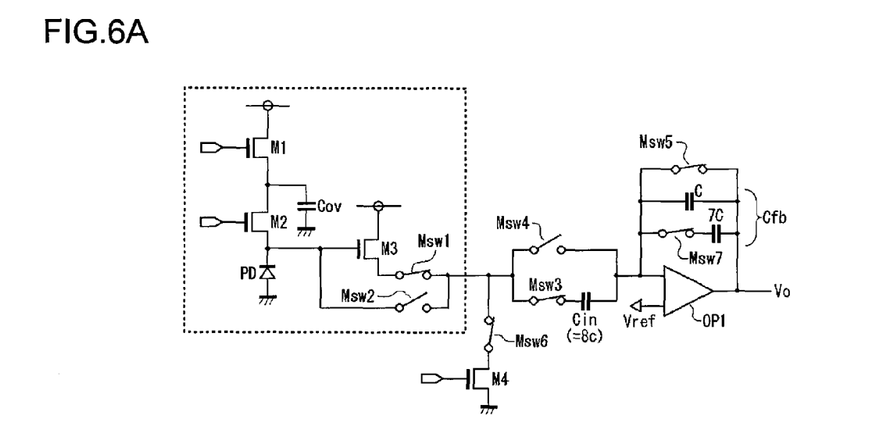
FIGS. 6A to 6C are circuit diagrams showing on and off states for each transistor in a first mode.
Figure 6B:
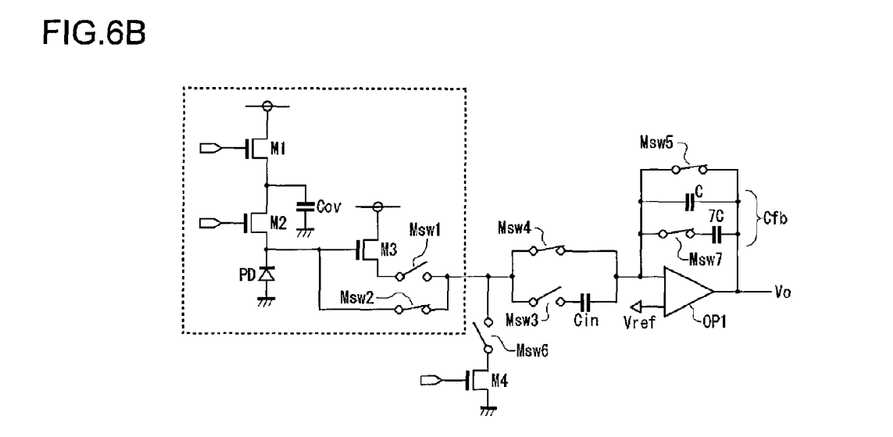
Figure 6C:
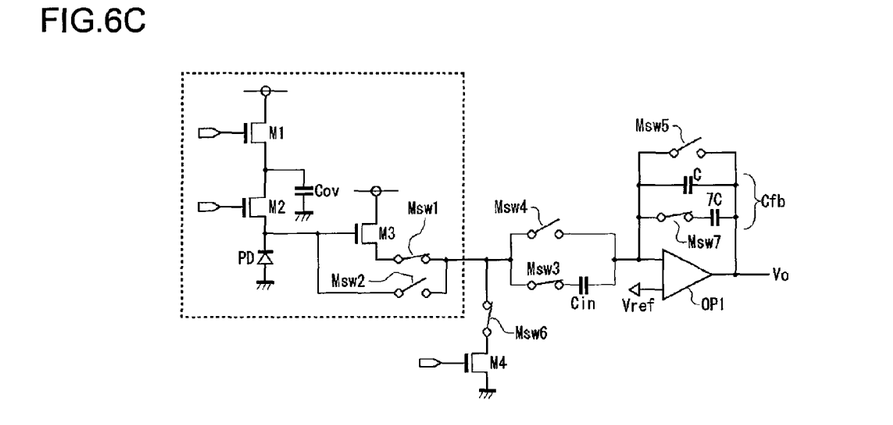
Figure 7:
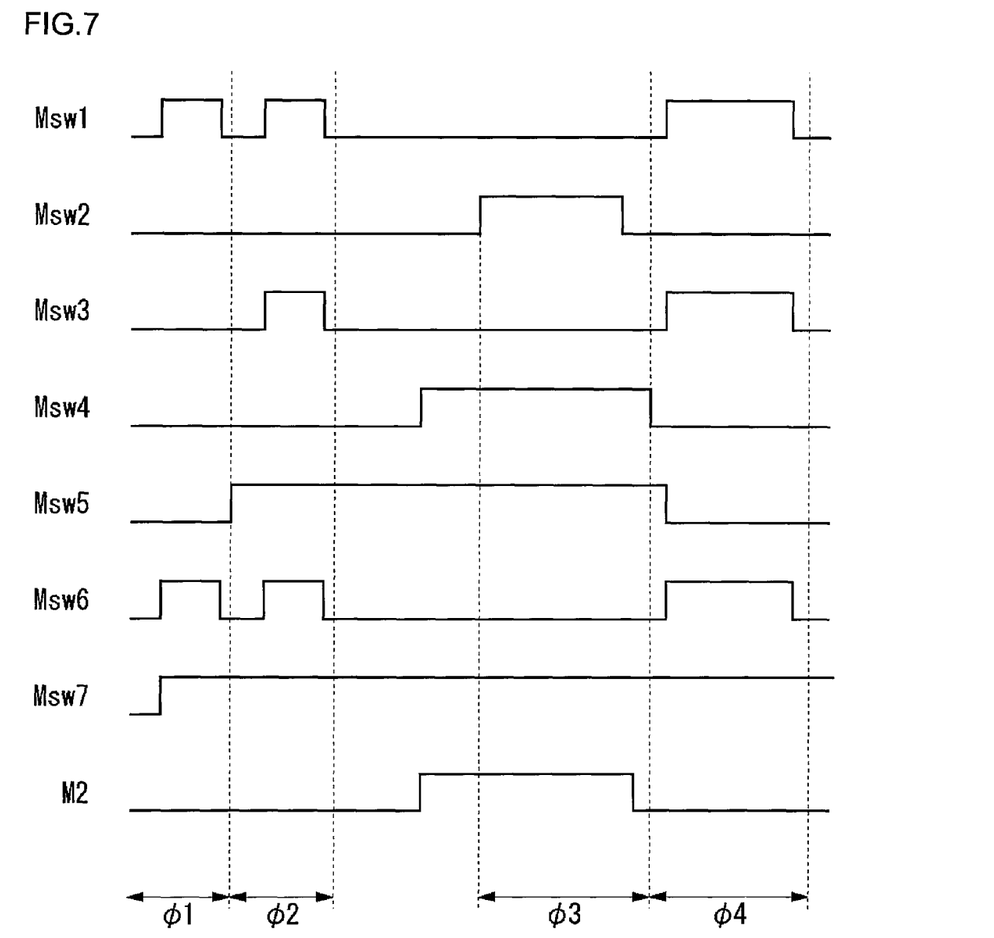
FIG. 7 is an operation sequence diagram for each pixel in a first mode.

A description will be given of an operation of the photo detection device 300 thus structured according to the present embodiment as described above. Firstly, the operation in the first mode will be explained. FIGS. 6A to 6C are circuit diagrams showing on and off states for each transistor in the first mode. FIG. 7 is an operation sequence diagram for each pixel in the first mode. In FIG. 7, the high level of each signal corresponds to the ON state of each transistor, and the low level of each signal corresponds to the OFF state thereof.

As shown in FIG. 7, there is a level deciding period φ1 provided before the detection of the amount of light received by each pixel circuit. During this level deciding period φ1, the first switching transistor Msw1 and the sixth switching transistor Msw6 are at least on, and the potential on the data line LD is set by the source follower amplifier. The mode control circuit CNT sets the first mode or the second mode according to the potential on the data line LD at this time, and also sets the gain.

It is assumed that the first mode is set during the level deciding period φ1 and the gain of the output amplifier is set to 1×.

The level deciding period φ1 is followed by a potential detecting period φ2. During the potential detecting period φ2, at least the first switching transistor Msw1, the third switching transistor Msw3, the fifth switching transistor Msw5 and the sixth switching transistor Msw6 turn on first. FIG. 6A shows the state at this point. With the fifth switching transistor Msw5 turning on, the operational amplifier OP1 functions as a voltage follower. At this time, the potential at the first input terminal of the operational amplifier OP1 is the reference voltage Vref applied to the second input terminal, which is applied to the right-hand electrode of the input capacitor Cin.

Also, with the first switching transistor Msw1, the third switching transistor Msw3 and the sixth switching transistor Msw6 turning on, the potential at the cathode terminal of the photodiode PD at this time is read out through the source follower amplifier. The potential at the cathode terminal of the photodiode PD is stored in the left-hand electrode of the input capacitor Cin(=8 C). The gain of the output amplifier is set to 1×, so that the seventh switching transistor MSw7 is turned on and the capacitance of the feedback capacitor Cfb is set to 8 C. If the gain is set to 8×, the seventh switching transistor Msw7 will be turned off and the feedback capacitor Cfb will be C.

In the following reset period $\phi 3$, the overflow transistor M2 is set to ON, and the overflow capacitor Cov and the cathode capacitance Cpd are conducted, thus resetting the photodiode PD. FIG. 6B shows the state at this point. In this detection period $\phi 2$, the fifth switching transistor Msw5 is once turned off and then the third switching transistor Msw3 is turned off. In this state, the fifth switching transistor Msw5 is again turned on. As a result, the nonlinearlity depending on the potential of the cathode terminal can be reduced. Shown here is the case where the pixel is reset using output amplifier AMP. However, in this reset period $\phi 3$, the overflow capacitor Cov and the cathode capacitance Cpd may be reset by turning on the reset transistor M1 and the overflow transistor M2.

In the following read period $\phi 4$, the gate potential of the overflow transistor M2 is set slightly low so as to lower the overflow voltage, and the first switching transistor Msw1 and the third switching transistor Msw3 are turned on. As a result, the electric charge stored in the input capacitor Cin is transferred to the feedback capacitor Cfb. FIG. 6C shows the state at this point. In the first mode, each pixel circuit outputs a voltage according to the amount of light received through a sequence of operation as described above.

Figure 8A:
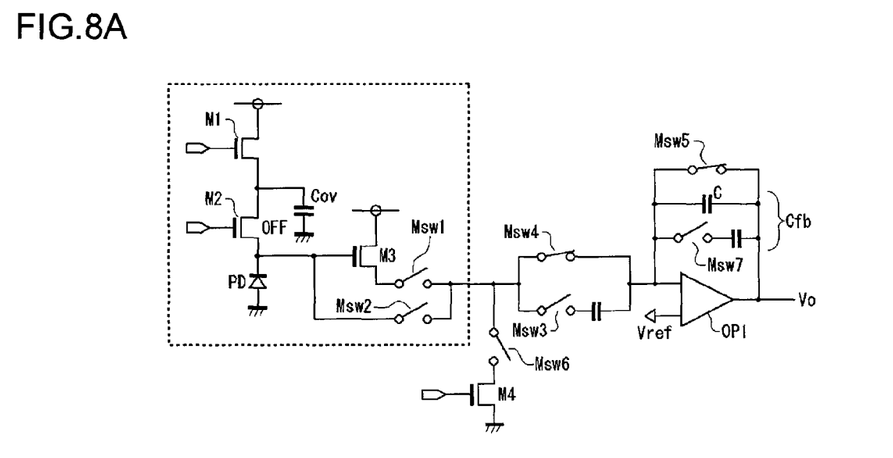
FIGS. 8A to 8C are circuit diagrams showing on and off states for each transistor in a second mode.
Figure 8B:
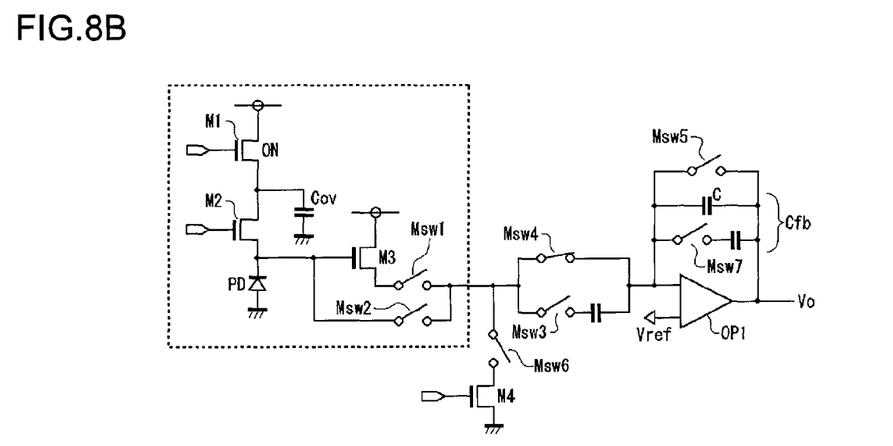
Figure 8C:
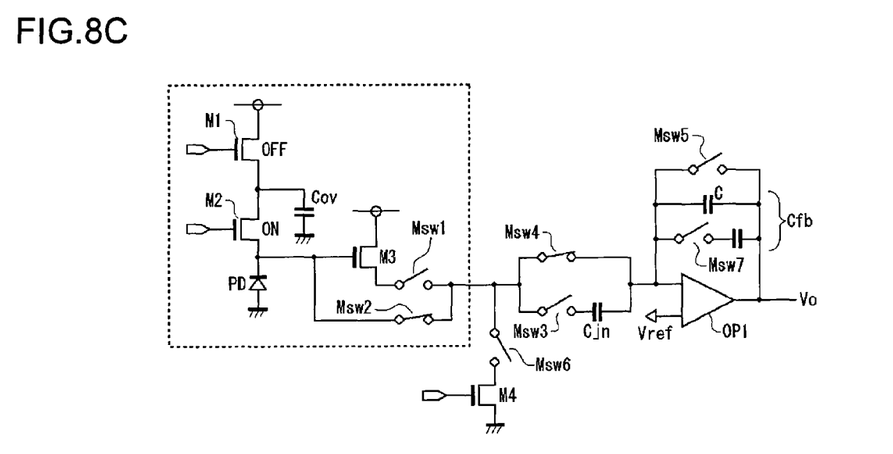
Figure 9:
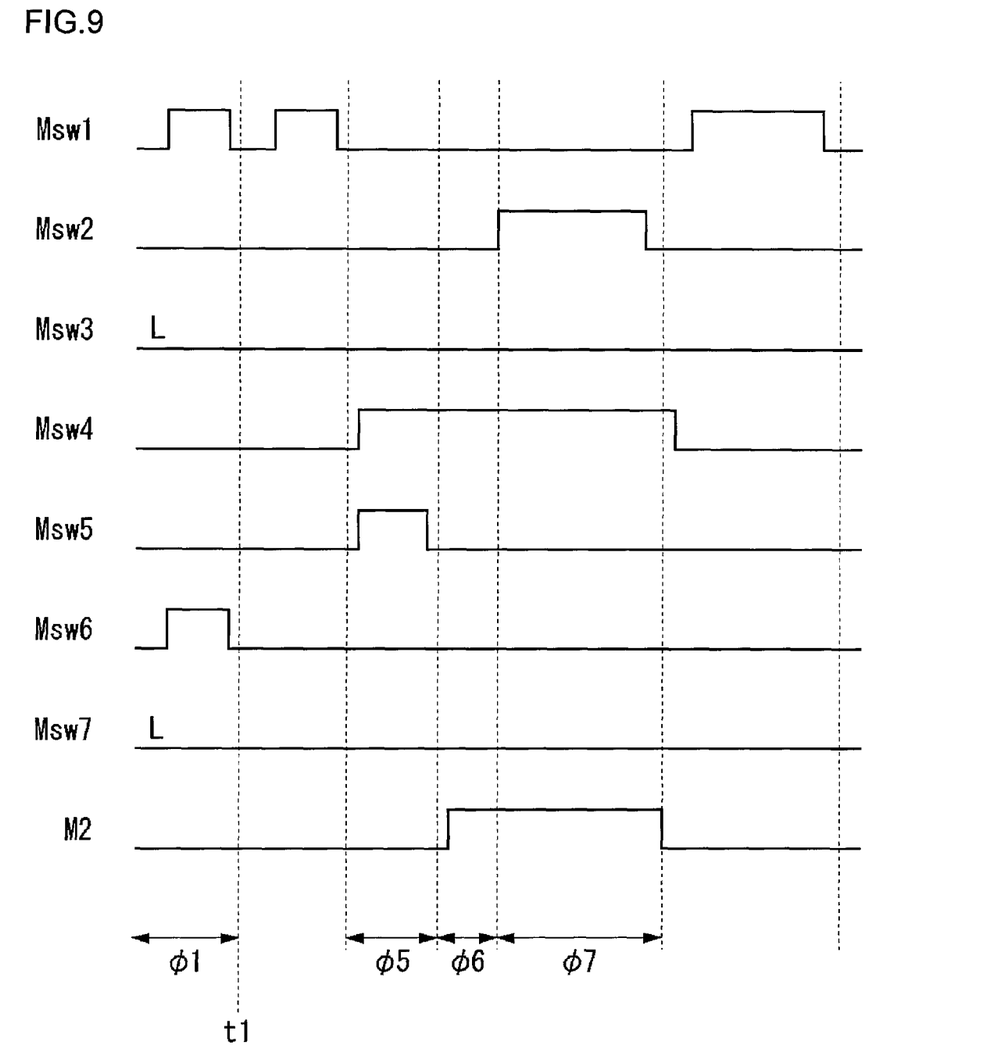
FIG. 9 is an operation sequence diagram for each pixel in a second mode.

Next, an operation in the second mode will be explained. FIGS. 8A to 8C are circuit diagrams showing on and off states for each transistor in the second mode. FIG. 9 is an operation sequence diagram for each pixel in the second mode.

There is a level deciding period $\phi 1$ provided before the detection of the amount of light received by each pixel circuit. And the first and the second mode are set, and further the gain is set. During the level deciding period $\phi 1$, the second mode is set. Since the source follower amplifier does not operate in the second mode, the first switching transistor Msw1 and the third switching transistor Msw3 are turned off.

The level deciding period $\phi 1$ is followed by a virtual grounding period $\phi 5$. During the virtual grounding period $\phi 5$, the fifth switching transistor Msw5 turns on, and the output amplifier AMP is set to the voltage follower. As a result, the first and second input terminals are virtually grounded, and the electric charge stored in the feedback capacitor Cfb is reset. FIG. 8A shows the state at this point.

Then, during a reset period $\phi 6$, the overflow transistor M2 is switched to ON, so that the electric charge at the cathode capacitance Cpd of the photodiode PD is added up with the electric charge at the overflow capacitor Cov. FIG. 8B shows the state at this point.

Next, in a read period $\phi 7$, the second switching transistor Msw2 is turned on, while the overflow transistor M2 is kept on, so that the electric charge stored in the cathode capacitance Cpd is transferred to the feedback capacitor Cfb through the data line. As a result, the output amplifier AMP converts the charge into a voltage and outputs the output voltage Vo according to the amount of light received. FIG. 8C shows the state at this point.

The structure and operation of the photo detection device 300 according to an embodiment are as described hereinabove. Thus the pixel circuit 100 of the photo detection device 300 according to the present embodiment is comprised of the first sensing circuit 42 that functions as an active pixel sensor and the second sensing circuit 44 that functions as a passive pixel sensor. As a result the first mode and the second mode can be switched therebetween according to the amount of light received, and it is possible to widen the dynamic range.

Moreover, the dynamic range can be further widened by switching the gain of the output amplifier AMP in the first mode, the storage period in the second mode and the like according to the amount of light received.

When it is attempted to widen the dynamic range by changing the gain and storage time with only an active pixel sensor of conventional technology, it is necessary to make the storage time extremely short when the amount of light received is large. This results in the problem of larger scale of circuit and more power consumption. On the contrary to this, for the photo detection device 300 according to the present embodiment, it is not necessary to make the storage time that short because the pixel circuit 100 functions also as a passive pixel sensor in response to high illuminance. Hence, this can suppress the circuit from getting more complex, larger in scale and more power-consuming.

In the first mode of FIG. 7, there is a blank period between the potential detecting period $\phi 2$ and the reset period $\phi 3$, whereas in the second mode of FIG. 9 there is a blank period between the level deciding period $\phi 1$ and the virtual grounding period $\phi 5$. This is because the control signals of the first switching transistor Msw1 and the second switching transistor Msw2 are to be put to a common use in the first and the second mode. The control signals thereof are commonly used in the first and the second mode, so that the circuitry can be further simplifier. However, the present invention is not limited thereto, and control sequences may be independently designed.

The invention has been explained based upon the embodiments. These exemplary embodiments are intended to be illustrative only and it will be obvious to those skilled in the art that various modifications to constituting elements and processes could be developed and that such modifications are also within the scope of the present invention.

For example, in a modification, the electric charge of the cathode capacitance Cpd, namely the potential at the cathode terminal of the photodiode PD, may be initialized using the reference voltage Vref applied to the operational amplifier OP1 in the output amplifier 110 of FIG. 3, prior to the light receiving at each pixel. As shown in FIG. 3, the output amplifier AMP includes the operational amplifier OP1 wherein a predetermined reference voltage Vref is inputted to one input terminal of the operational amplifier OP1 and the output signal of the first sensing circuit 42 or second sensing circuit 44 is inputted to the other input terminal thereof. In this modification, the charge is initialized by applying the predetermined reference voltage Vref to the cathode capacitance Cpd via the second sensing circuit 44 (namely, the second switching transistor Msw2) prior to the photo-detection at each pixel.

Furthermore, the reference voltage Vref may be set to different values between in the first mode and the second mode. In this modification, the reference voltage in the second mode (hereinafter referred to as second reference voltage Vref2) is set lower than the reference voltage in the first mode (hereinafter referred to as first reference voltage Vref1).

To reset the cathode capacitance Cpd in the first mode of this modification, the third switching transistor Msw3 and the fifth switching transistor Msw5 are turned on and the second switching transistor Msw2 is also turned on. As a result, the potential at the cathode terminal of the photodiode PD is initialized as nearly equal to the first reference voltage Vref.

On the other hand, to reset the cathode capacitance Cpd in the second mode, the fourth switching transistor Msw4 and the fifth switching transistor Msw5 are turned on and the second switching transistor Msw2 is also turned on. As a result, the potential at the cathode terminal of the photodiode PD is set nearly equal to the second reference voltage Vref2.

Figure 10:
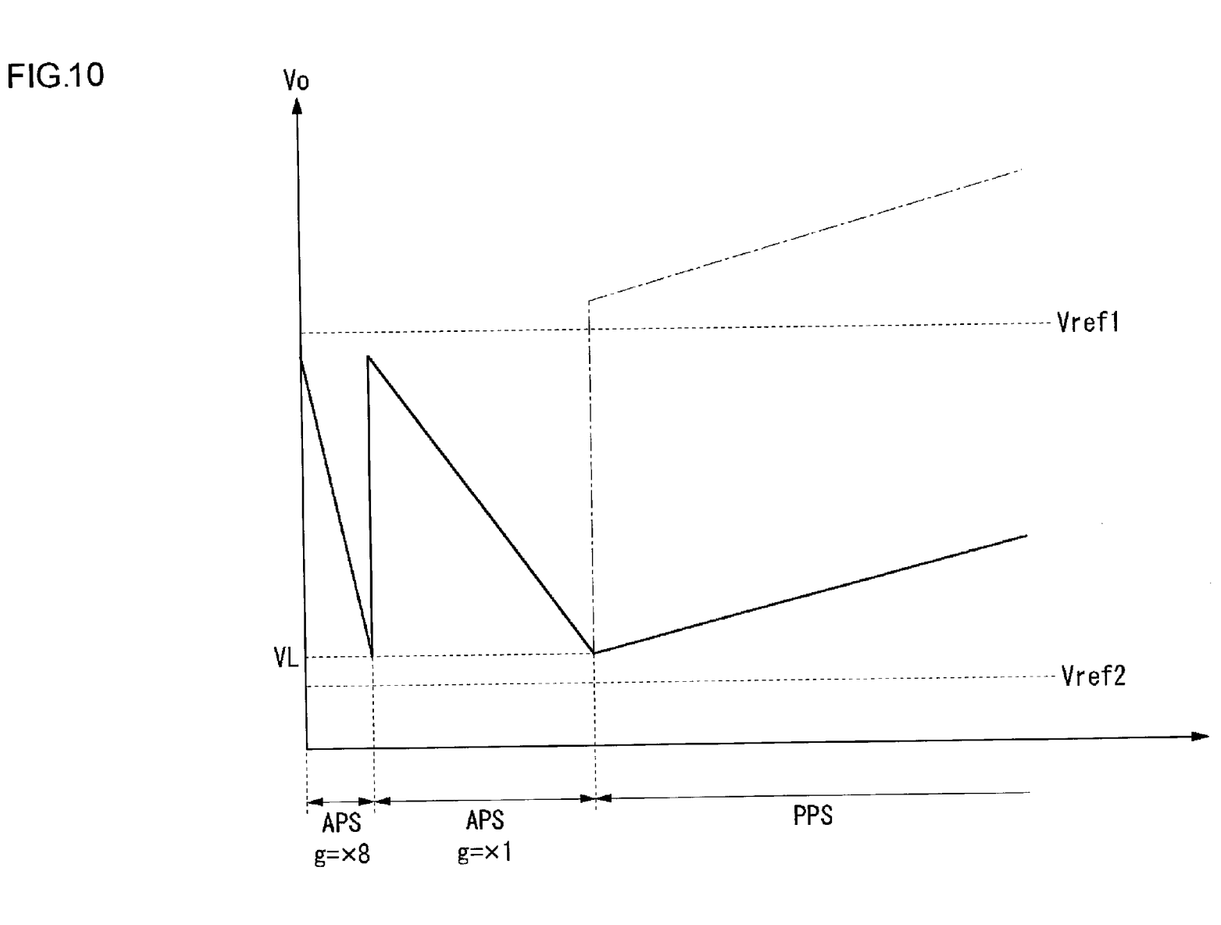
FIG. 10 shows an operating state of a pixel circuit according to a modification.

Thus, in this modification, not only the output amplifier 110 but also the cathode capacitance Cpd of the photodiode PD is initialized by the reference voltage Vref. FIG. 10 shows an operating state of the pixel circuit 100 according to this modification.

In FIG. 10, the horizontal axis represents the amount of light received, and the vertical axis the output voltage Vo. When the gain in the first mode is 8×, the cathode capacitance Cpd of the photodiode PD is initialized by the first reference voltage Vref1 through the above-described process. At this time, the output voltage Vo takes a value near the first reference voltage Vref1. As the amount of light received increases, the output voltage Vo drops gradually from the neighborhood of the first reference voltage Vref1.

When the gain in the first mode is 1×, the cathode capacitance Cpd of the photodiode PD is initialized by the first reference voltage Vref1 in the same manner as when the gain is 8×. As the amount of light received increases, the output voltage Vo drops. The then slope is dependent on the gain of the output amplifier AMP.

In the second mode, the cathode capacitance Cpd of the photodiode PD is initialized by the second reference voltage Vref2. The output voltage Vo takes the voltage near the second reference voltage Vref2 as the initial value, and increases according to the amount of light received. In this manner, the direction of increase and decrease in the output voltage Vo relative to the amount of light received is opposite between the first mode and the second mode, and the dependence of the output voltage Vo of the output amplifier AMP on the amount of light received is opposite between them.

In FIG. 10, the operation when the same value (=Vref1) is set for the reference voltage Vref for both the first mode and the second mode is shown by a dashed-dotted line. In this case, in the second mode, the output voltage Vo is initialized by the reference voltage Vref1 and increases according to the amount of light received. As a result, the voltage range of the output voltage Vo will be very wide if both the first mode and the second mode are taken into consideration. This means a narrowed dynamic range of the amount of light received, in a circuit that limits the supply voltage Vdd.

In contrast thereto, in this modification, the voltage range of the output voltage Vo can be set narrower by switching the reference voltage applied to the output amplifier AMP between the first mode and the second mode. Thus, the dynamic range of the amount of light received can be widened.

In this modification, the cathode capacitance Cpd is initialized by the output amplifier AMP and the second switching transistor Msw2. Thus it is possible to omit the reset transistor in the overflow circuit 40 shown in FIG. 3. Even in a case where the cathode capacitance Cpd according to the modification is initialized, the overflow circuit 40 may be provided.

Also, as a modification to this modification, while the reference voltage is fixed to a constant value, inverting gain and noninverting gain may be switched with each other by providing a switch such that the input terminal of the output amplifier AMP can be changed between the first mode and the second mode. In this case, the direction of change in the output voltage Vo relative to the amount of light received is the same between the first mode and the second mode, so that the voltage range can be made narrower.

In an embodiment, the processing from the time t1 till the time t2 may be repeated a plurality of times with the storage time varied so as to acquire data having different exposure times. In this case, the signal processing unit 30 may output optimum data from a plurality of pieces of data.

In the preferred embodiments, the transistors used in the pixel circuit have all been N-channel MOSFETs. However, this should not be considered as limiting, and it is possible to configure the circuit by using P-channel MOSFETs for some of the transistors. In such a case, the high level and the low level of the signals to be applied to the gates may be inverted as appropriate.

In the preferred embodiments, each pixel is provided with a photodiode PD. However, a phototransistor or the like may be used instead. Any photo detecting element in which the flow of photocurrent changes according to the intensity of incident light may be acceptable.

While the invention has been described based on the preferred embodiments, such description is for illustrative purposes only, and it is to be understood that many more variations and changes in arrangement may be made without departing from the spirit or scope of the appended claims.

What is claimed is:

1. A photo detection device having pixel circuits arranged respectively in intersections of a plurality of data lines and scanning lines, the device comprising:
   a first sensing circuit which becomes active in a first mode, charges and discharges a capacitance with a photocurrent flowing through a photo detecting element of each pixel circuit and which amplifies and outputs a voltage obtained thereby by a source follower amplifier;
   a second sensing circuit which becomes active in the second mode, charges and discharges a capacitance with the photocurrent flowing through the photo detecting element, for a predetermined storage time, and outputs electric charge stored in the capacitance; and
   an output amplifier, provided for each of the plurality of data lines, which amplifiers the voltage outputted from said first sensing circuit at a predetermined gain in the first mode and which converts the electric charge outputted from said second sensing circuit, into voltage in the second mode,
   wherein the first mode and the second mode are switched according to an amount of light received by the photo detecting element included in each pixel circuit; the gain is controlled, according to the amount of light received, in the first mode; and the storage time is controlled in the second mode.

2. A photo detection device according to claim 1, wherein switching the first mode and the second mode therebetween, controlling the gain in the first mode, and controlling the storage time in the second mode are performed prior to photodetection at each pixel.

3. A photo detection device according to claim 1, wherein said photo detection device operates under the first mode when the amount of light received is less than a predetermined threshold value, and it operates under the second mode when the amount of light received is greater than the predetermined threshold value.

4. A photo detection device according to claim 1, wherein as the amount of light received becomes smaller in the first mode, the gain is set higher.

5. A photo detection device according to claim 1, wherein as the amount of light received becomes larger in the second mode, the storage time is set shorter.

6. A photo detection device according to claim 1, wherein switching the first mode and the second mode therebetween, controlling the gain in the first mode, and controlling the storage time in the second mode are performed according to potential of a data line to which each pixel connects.

7. A photo detection device according to claim 6, wherein a mode control circuit which switches between the first mode and the second mode and controls the gain and the storage time is provided for the each data line, and
wherein said mode control circuit switches between the first mode and the second mode and controls the gain and the storage time according to the potential of the data line.

8. A photo detection device according to claim 7, said mode control circuit includes:
a first comparator which compares the potential of the data line with a first predetermined threshold voltage; and
a second comparator which compares the potential of the data line with a second predetermined threshold voltage,
wherein said mode control circuit switches between the first mode and the second mode according to an output of the first comparator, and switches the gain according to an output of the second comparator.

9. A photo detection device according to claim 1, wherein said output amplifier includes an operational amplifier to one input terminal of which a predetermined reference voltage is inputted and the other input terminal of which an output signal of said first sensing circuit or said second sensing circuit is inputted, and
wherein, prior to photo-detection at each, pixel the capacitance is initialized by applying the predetermined reference voltage to the capacitance via the second sensing circuit.

10. A photo detection device according to claim 8, wherein the predetermined voltage is switched according to the switching between the first mode and the second mode.

11. A photo detection device having pixel circuits arranged respectively in intersections of a plurality of data lines and scanning lines, each of the pixel circuits comprising:
a photo detecting element;
a first sensing circuit which charges and discharges a capacitance with a photocurrent flowing through said photo detecting element, amplifies a voltage obtained thereby by a source follower amplifier and outputs the amplifier voltage to the data line; and
a second sensing circuit which charges and discharges a capacitance with the photocurrent flowing through said photo detecting element and outputs electric charge stored in the capacitance via the data line,
wherein a first mode at which said first sensing circuit becomes active and a second mode at which said second sensing circuit becomes active are configured in such a manner as to be switchable therebetween,
said photo detection device further comprising:
an output amplifier, provided for each of the plurality of data lines, which amplifiers the voltage outputted from said first sensing circuit in the first mode and which converts the electric charge outputted from said second sensing circuit, into voltage in the second mode; and
a mode control circuit, provided for each of the plurality of data lines, which switches operational modes of the pixel circuit and said output amplifier according to an amount of light received by said photo detecting element included in the pixel circuit to be connected.

12. A photo detection device according to claim 11, said first sensing circuit including:
an amplifying transistor a gate terminal of which is connected to one end of said photo detecting element; and
a first switching transistor provided between a source terminal of the amplifying transistor and the data line to which the pixel circuit connects,
wherein said second circuit includes a second switching transistor provided on a path leading from one end of said photo detecting element to the data line to which the pixel circuit connects, and
wherein the first switching transistor turns on in the first mode, and the second switching transistor turns on in the second mode.

13. A photo detection apparatus according to claim 11, said output amplifier including:
an operational amplifier, having a first input terminal and a second input terminal, wherein a predetermined reference voltage is applied to the second input terminal thereof;
an input capacitor and a third switching transistor provided in series between the first input terminal of the operational amplifier and the data line;
a fourth switching transistor which bypasses the input capacitor and the third switching transistor when the fourth switching transistor is on;
a feedback capacitor provided between the output terminal of the operational amplifier and the first input terminal thereof; and
a fifth switching transistor provided on a feedback path in parallel with the feedback capacitor,
wherein in the first mode the voltage outputted from the first sensing circuit is amplified at gain determined by a ratio in capacitance of the input capacitor and the feedback capacitor, and
wherein in the second mode electric charge outputted from the second sensing circuit is transferred to the feedback capacitor to be converted to a voltage.

14. A photo detection device according to claim 13, wherein the feedback capacitor is a variable capacitor, and said mode control circuit switches a capacitance value of the feedback capacitor according to an amount of light received by the photo detecting element.

15. A photo detection device according to claim 11, wherein in the second mode said control circuit varies the storage time for charging and discharging by the photocurrent, according to the amount of light received by the photo detecting element.

16. A photo detection device according to claim 12, wherein a load circuit connected to the source terminal of the amplifying transistor is provided, for the each data line, external to the pixel circuit.

17. A photo detection device according to claim 16, wherein the load circuit includes a transistor, provided between the data line and a terminal at which a potential is fixed, which turns on in the first mode and turns off in the second mode.

18. A photo detection device according to claim 11, wherein said mode control circuit monitors potential of an associated data line, and switches between the first mode and the second mode according to the potential of the data line.

19. A photo detection device according to claim 18, wherein said mode control circuit includes a comparator which compares the potential of the data line with a predetermined threshold voltage, and said control circuit switches between the first mode and the second mode according to an output signal of the comparator.

* * * * *